(12) United States Patent
Cho et al.

(10) Patent No.: US 11,874,112 B1
(45) Date of Patent: Jan. 16, 2024

(54) VIBRATORY GYROSCOPES WITH RESONATOR ATTACHMENTS

(71) Applicant: Enertia Microsystems Inc., San Leandro, CA (US)

(72) Inventors: Jae Yoong Cho, Albany, CA (US); Khalil Najafi, Ann Arbor, MI (US)

(73) Assignee: Enertia Microsystems Inc., San Leandro, CA (US)

( * ) Notice: Subject to any disclaimer, the term of this patent is extended or adjusted under 35 U.S.C. 154(b) by 0 days.

(21) Appl. No.: 18/480,658

(22) Filed: Oct. 4, 2023

Related U.S. Application Data

(60) Provisional application No. 63/378,297, filed on Oct. 4, 2022.

(51) Int. Cl.
*G01C 19/5712* (2012.01)

(52) U.S. Cl.
CPC ................. *G01C 19/5712* (2013.01)

(58) Field of Classification Search
CPC ........................ G01C 19/5712; G01C 19/5691
See application file for complete search history.

(56) References Cited

U.S. PATENT DOCUMENTS

| | | |
|---|---|---|
| 6,474,161 B1 | 11/2002 | Jeanroy et al. |
| 6,662,656 B2 | 12/2003 | Jeanroy |
| 6,945,109 B2 | 9/2005 | Renault et al. |
| 7,093,488 B2 | 8/2006 | Ragot et al. |
| 7,222,513 B2 | 5/2007 | Caron et al. |
| 7,318,347 B2 | 1/2008 | Lynch et al. |
| 7,621,184 B2 | 11/2009 | Caron |

(Continued)

FOREIGN PATENT DOCUMENTS

| | | |
|---|---|---|
| CN | 103528576 A | 1/2014 |
| CN | 104197909 A | 12/2014 |

(Continued)

OTHER PUBLICATIONS

A. Darvishian et al., "Anchor Loss in Hemispherical Shell Resonators", IEEE JMEMS, Feb. 2017, http://www.ieee.org/publications_standards/publications/rights/index.html for more information.

(Continued)

*Primary Examiner* — David J Bolduc
(74) *Attorney, Agent, or Firm* — Polygon IP, LLP

(57) ABSTRACT

Disclosed herein are vibratory gyroscopes comprising hollow shell resonators and methods of fabricating thereof. Specifically, a vibratory gyroscope comprises a support substrate comprising a substrate primary surface and a resonator support surface, substantially perpendicular to the substrate primary surface. The gyroscope also comprises a hollow shell resonator comprising a resonator inner surface and a resonator outer surface such that the resonator inner surface defines a recessed region with a recessed region opening facing the substrate primary surface. At least one of the inner or outer resonator surfaces is attached to the resonator support surface of the support substrate adjacent to the inner edge surface of the resonator. The inner edge surface can be formed by a hollow stem with or without opening through this surface. Furthermore, the resonator support surface can be a continuous cylindrical surface or a segmented surface.

20 Claims, 9 Drawing Sheets

(56) References Cited

U.S. PATENT DOCUMENTS

| | | |
|---|---|---|
| 7,839,059 B2 | 11/2010 | Choi et al. |
| 8,210,041 B2 | 7/2012 | Ragot |
| 8,490,485 B2 | 7/2013 | Vandebeuque et al. |
| 8,631,702 B2 | 1/2014 | Horning et al. |
| 8,806,939 B2 | 8/2014 | Painter |
| 9,068,833 B2 | 6/2015 | Vandebeuque |
| 9,146,108 B2 | 9/2015 | Caron |
| 9,296,133 B2 | 3/2016 | Shkel et al. |
| 9,303,995 B2 | 4/2016 | Eudier et al. |
| 9,423,253 B2 | 8/2016 | Bernstein et al. |
| 9,429,428 B2 | 8/2016 | Shkel et al. |
| 9,494,425 B2 | 11/2016 | Najafi et al. |
| 9,702,728 B2 | 7/2017 | Shkel et al. |
| 9,786,586 B1 | 10/2017 | Shih |
| 9,989,363 B2 | 6/2018 | Saito et al. |
| 10,119,820 B2 | 11/2018 | Rozelle et al. |
| 10,527,422 B2 | 1/2020 | Shang et al. |
| 10,532,943 B2 | 1/2020 | Najafi et al. |
| 10,612,925 B2 | 4/2020 | Najafi et al. |
| 11,703,331 B2 | 7/2023 | Najafi et al. |
| 11,740,087 B2 * | 8/2023 | Harada ............... G01C 19/5691 73/862.041 |
| 2011/0290021 A1 | 12/2011 | Horning et al. |
| 2012/0144917 A1 * | 6/2012 | Painter ............... G01C 19/5691 29/592.1 |
| 2012/0216620 A1 * | 8/2012 | Vandebeuque ........ G01C 19/56 73/649 |
| 2012/0227493 A1 | 9/2012 | Vandebeuque |
| 2013/0160578 A1 * | 6/2013 | Najafi ................... G01C 19/28 74/5.6 D |
| 2013/0239682 A1 * | 9/2013 | Painter ................. C23C 28/042 427/126.3 |
| 2014/0021561 A1 * | 1/2014 | Trusov ................ B81C 1/00134 257/415 |
| 2014/0102193 A1 * | 4/2014 | Chikovani ............. G01C 19/56 73/504.12 |
| 2016/0047653 A1 * | 2/2016 | Shkel ................ G01C 19/5691 73/504.13 |
| 2016/0164458 A1 * | 6/2016 | Nguyen .................... H01P 1/39 331/154 |
| 2016/0231113 A1 * | 8/2016 | Rozelle .............. G01C 19/5691 |
| 2016/0344368 A1 * | 11/2016 | Ayazi .................... H03H 3/0072 |
| 2017/0016742 A1 * | 1/2017 | Shkel ..................... G01C 25/00 |
| 2017/0038208 A1 | 2/2017 | Guo |
| 2017/0248422 A1 * | 8/2017 | Najafi ....................... G01D 5/34 |
| 2018/0188030 A1 * | 7/2018 | Shang ................ G01C 19/5691 |
| 2019/0094024 A1 * | 3/2019 | Najafi ................ G01C 19/5691 |
| 2020/0309527 A1 * | 10/2020 | Shkel ................. G01C 19/5719 |
| 2022/0026210 A1 * | 1/2022 | Tseng ................. G01C 19/5712 |
| 2022/0090917 A1 * | 3/2022 | Najafi .................. G01C 19/005 |
| 2022/0187072 A1 * | 6/2022 | Akashi ..................... B81C 3/001 |
| 2022/0315411 A1 * | 10/2022 | Ito ....................... G01C 19/5691 |
| 2022/0316880 A1 * | 10/2022 | Harada ................... G01S 19/47 |
| 2022/0373332 A1 * | 11/2022 | Inagaki .............. G01C 19/5712 |
| 2023/0288203 A1 * | 9/2023 | Harada .............. G01C 19/5712 73/504.12 |
| 2023/0324175 A1 * | 10/2023 | Nishikawa ............ B81B 3/0086 73/504.12 |

FOREIGN PATENT DOCUMENTS

| | | |
|---|---|---|
| CN | 104197910 A | 12/2014 |
| CN | 104197912 A | 12/2014 |
| CN | 104197917 A | 12/2014 |
| CN | 104197921 A | 12/2014 |
| CN | 105698780 A | 6/2016 |
| CN | 107055457 A | 8/2017 |
| CN | 107560607 A | 1/2018 |
| CN | 107655466 A | 2/2018 |
| CN | 109115243 A | 1/2019 |
| CN | 109186574 A | 1/2019 |

OTHER PUBLICATIONS

Kanik et. al., "Metallic Glass Hemispherical Shell Resonators", IEEE JMEMS, Feb. 2015, http://www.ieee.org/publications_standards/publications/rights/index.html.

* cited by examiner

# VIBRATORY GYROSCOPES WITH RESONATOR ATTACHMENTS

CROSS-REFERENCE TO RELATED APPLICATIONS

This application claims the benefit under 35 U.S.C. § 119(e) of US Provisional Patent Application 63/378,297, filed on 2022 Oct. 4, which is incorporated herein by reference in its entirety for all purposes.

BACKGROUND

Vibratory gyroscopes, which may be also referred to as vibrating structure gyroscopes, use vibrating structures (e.g., resonators) to determine various parameters (e.g., rotation rates). Specifically, a vibrating object continues to vibrate in the same direction even when this object (or the entire gyroscope) rotates. Vibratory gyroscopes can be made smaller and cheaper than other types of gyroscopes while providing high accuracy. These features make vibratory gyroscopes particularly useful in many devices such as smartphones and other electronic devices for use in a variety of applications such as consumer products, autonomous systems, space, and defense.

SUMMARY

Disclosed herein are vibratory gyroscopes comprising hollow shell resonators and methods of fabricating thereof. Specifically, a vibratory gyroscope comprises a support substrate with a substrate primary surface and a resonator support surface, substantially perpendicular to the substrate primary surface. The gyroscope also comprises a hollow shell resonator with a resonator inner surface and a resonator outer surface such that the resonator inner surface defines a recessed region with the opening facing the substrate primary surface. The inner and/or outer resonator surface is attached to the resonator support surface of the support substrate adjacent to the inner edge surface of the resonator. The inner edge surface can be formed by a hollow stem with or without an opening through this surface. Furthermore, the resonator support surface can be continuous or segmented.

Clause 1. A vibratory gyroscope comprising: a primary axis; a support substrate comprising a substrate primary surface and a resonator support surface, extending substantially perpendicular to the substrate primary surface; and a hollow shell resonator comprising a resonator inner surface, a resonator outer surface, an inner edge surface, and an outer edge surface, wherein: the resonator outer surface is opposite of and separated by a wall thickness from the resonator inner surface, the outer edge surface extends between the resonator inner surface and the resonator outer surface, having an annulus shape, and facing the substrate primary surface, the inner edge surface is surrounded by the resonator inner surface, positioned closer to the primary axis than the outer edge surface, and facing the substrate primary surface, the resonator inner surface defines a recessed region having a recessed region opening extending between the outer edge surface and the inner edge surface, having an annulus shape, and facing the substrate primary surface, the resonator outer surface extends to the inner edge surface or is separated from the inner edge surface by the wall thickness, and at least one of the resonator inner surface and the resonator outer surface is attached to the resonator support surface of the support substrate adjacent to the inner edge surface.

Clause 2. The vibratory gyroscope of clause 1, wherein the resonator outer surface extends to the inner edge surface and defines a resonator passthrough opening such that the inner edge surface has an annulus shape and surrounds the resonator passthrough opening.

Clause 3. The vibratory gyroscope of clause 1, wherein the resonator outer surface is separated from the inner edge surface by the wall thickness defines a resonator blind opening such that the inner edge surface has a circular shape defined by the resonator inner surface.

Clause 4. The vibratory gyroscope of clause 1, wherein the resonator inner surface is attached to the resonator support surface of the support substrate.

Clause 5. The vibratory gyroscope of clause 4, wherein the resonator support surface, to which the resonator inner surface is attached, is formed by an outer support protrusion, extending from the substrate primary surface substantially parallel to the primary axis.

Clause 6. The vibratory gyroscope of clause 4, wherein the resonator support surface, to which the resonator inner surface is attached, is formed by a substrate recess extending from the substrate primary surface along the primary axis.

Clause 7. The vibratory gyroscope of clause 4, wherein the resonator outer surface is further attached to the resonator support surface of the support substrate formed by an inner support protrusion, extending from the substrate primary surface along the primary axis.

Clause 8. The vibratory gyroscope of clause 4, wherein the resonator outer surface is not attached and spaced away from the resonator support surface of the support substrate.

Clause 9. The vibratory gyroscope of clause 4, wherein the resonator outer surface is attached to the resonator support surface of the support substrate while the resonator inner surface is not attached and spaced away from the resonator support surface of the support substrate.

Clause 10. The vibratory gyroscope of clause 1, wherein the inner edge surface is separated from the support substrate by a gap.

Clause 11. The vibratory gyroscope of clause 1, wherein the inner edge surface is attached to the support substrate.

Clause 12. The vibratory gyroscope of clause 11, wherein the resonator outer surface extends to the inner edge surface and defines a resonator passthrough opening such that the inner edge surface has an annulus shape and surrounds the resonator passthrough opening.

Clause 13. The vibratory gyroscope of clause 11, wherein the resonator outer surface is separated from the inner edge surface by the wall thickness and defines a resonator blind opening such that the inner edge surface has a circular shape defined by the resonator inner surface.

Clause 14. The vibratory gyroscope of clause 13, wherein the inner edge surface is entirely attached to the support substrate.

Clause 15. The vibratory gyroscope of clause 13, wherein the inner edge surface is partially attached to the support substrate such that a portion of the inner edge surface is exposed.

Clause 16. The vibratory gyroscope of clause 1, wherein the resonator support surface is continuous, forming a cylindrical surface symmetrical about the primary axis.

Clause 17. The vibratory gyroscope of clause 1, wherein the resonator support surface is segmented and formed by a plurality of segments distributed about the primary axis.

Clause 18. The vibratory gyroscope of clause 17, wherein each adjacent pair of the plurality of segments is separated by a support surface gap.

Clause 19. The vibratory gyroscope of clause 1, wherein the recessed region of the hollow shell resonator has a half-toroidal shape.

Clause 20. The vibratory gyroscope of clause 1, further comprising a plurality of primary surface electrodes, wherein: the plurality of primary surface electrodes is positioned on and substantially parallel to the substrate primary surface, aligned and offset relative to the outer edge surface by a primary surface electrode gap, and the plurality of primary surface electrodes is uniformly distributed about the primary axis.

Clause 21. The vibratory gyroscope of clause 20, wherein the plurality of primary surface electrodes is formed by capacitive sensing electrodes.

Clause 22. The vibratory gyroscope of clause 20, further comprising a plurality of side electrodes, wherein: the plurality of side electrodes extends substantially perpendicular to the substrate primary surface and is aligned and offset relative to the resonator outer surface by a side electrode gap, and the plurality of side electrodes is uniformly distributed about the primary axis.

Clause 23. The vibratory gyroscope of clause 22, wherein the plurality of side electrodes is formed by capacitive sensing electrodes.

Clause 24. The vibratory gyroscope of clause 1, wherein each of the resonator inner surface and the resonator outer surface is formed by a metal.

Clause 25. The vibratory gyroscope of clause 1, wherein: the hollow shell resonator has a height of less than 10 cm, and the hollow shell resonator has a diameter of less than 10 cm.

These and other embodiments are described further below with reference to the figures.

DETAILED DESCRIPTION

Figure 1:
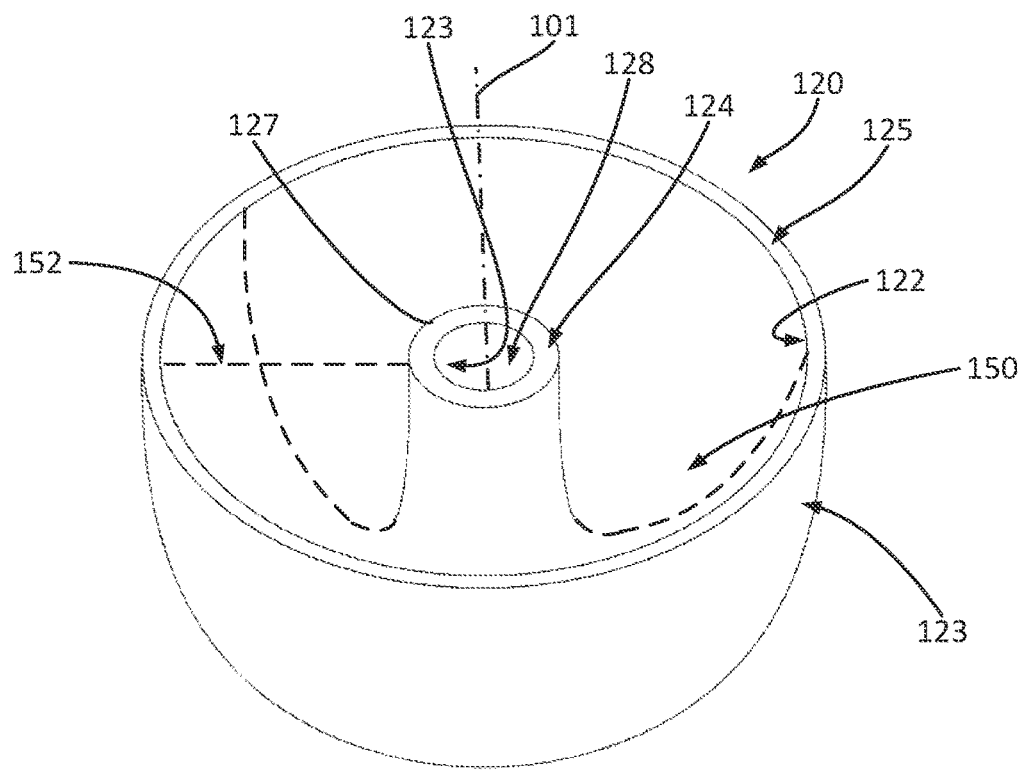
FIG. 1 is a bottom perspective view of a hollow shell resonator (for use in a vibratory gyroscope) illustrating the resonator's inner surface and stem, in accordance with some examples.

In the following description, numerous specific details are outlined in order to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

INTRODUCTION

Disclosed herein are vibratory gyroscopes, which may be also referred to as micro-vibratory gyroscopes. For example, a vibratory gyroscope may have a hollow shell resonator with a height of less than 10 cm and/or a diameter of less than 10 cm. Unlike other types of gyroscopes (e.g., dynamically tuned gyroscopes, ring laser gyroscopes), vibratory gyroscopes use support substrates and resonators (e.g., hollow shell resonators, tuning-fork resonators, ring resonators) with specific resonator-to-substrate attachments. Specifically, vibratory gyroscopes described herein have at least a portion of this resonator-to-substrate attachment or, more specifically, the attachment interface that extends in a substantially perpendicular direction to the substrate's primary surface. For purposes of this disclosure, the term "substantially perpendicular" is defined as an angle between 80° and 100° or, more specifically, between 85° and 95° (or less than 10° deviation from the normal or even less than 5° deviation). This attachment interface may also be referred to as a side attachment.

Without being restricted to any particular theory, it is believed that such orientation of the attachment interface (i.e., the side attachment) helps to significantly improve the performance of the vibratory gyroscopes, in comparison to the attachment interface extending substantially parallel to the substrate's primary surface (which may be referred to as a bottom attachment). The side attachment is found to be superior to the bottom attachment (i.e., inner edge surface attachment) because the side attachment produces lower maximum von Mises stress near the attachment interface normalized to the energy stored in the resonator (i.e., normalized von Mises stress). A finite element method (FEM) simulation found that a significant reduction (e.g., about 40%) in the normalized von Mises stress can be achieved by switching from the bottom attachment to the side attachment. This stress reduction could lead to lower anchor loss, higher Q, lower sensitivity of Q to thermo-residual and package stress at the attachment surfaces, and lower transmission of acoustic energy between the support substrate and the resonator through the attachment surfaces and the hollow stem. Overall, the side attachment is more tolerant to shock and vibration events.

In one example, a fused-silica 3D shell resonator with an open-ended hollow stem, a radius of 2.5 mm, a height of 2.5 mm, a radius of 0.5 mm for the attachment region, and a shell thickness of approximately 70 micrometers at the outer edge surface and the inner edge surface deflecting in the n=2 wine-glass mode at a frequency of approximately 13 kHz was used for FEM. The analysis found that when the hollow stem is attached to the support Zsubstrate only from the inner edge surface (the bottom-only attachment), the maximum von Mises stress at the inner edge surface normalized to the mechanical energy stored in the resonator is 39.408 MPa/J. When the resonator is attached from only the sidewall surfaces (the sidewall only attachment) of the hollow stem which is the resonator inner surface (length=300 micrometers), the maximum von Mises stress in the hollow stem near the resonator support surface and the at the inner edge surface normalized to the mechanical energy stored in the resonator is 23.832 MPa/J. When the resonator is attached from both the sidewall surface of the hollow stem (which is the resonator inner surface (length=300 micrometer)) and the entire inner edge surface, the maximum von Mises stress in the stem near the resonator support surface normalized to the mechanical energy stored in the resonator is 23.825 MPa/J.

Furthermore, vibratory gyroscopes described herein have hollow shell resonators that form/comprise hollow stems/hollow anchors. This type of hollow-shell resonator can be referred to as a hollow-stem resonator or a hollow-anchor resonator (or a hollow-shell hollow-stem resonator). Specifically, the stem has a cavity that extends substantially to the inner edge surface of the hollow shell resonator and, in some examples, can be open to the support substrate. Alternatively, the cavity can be defined by a resonator blind opening. In other words, the cavity can be separated from the support substrate by a thin wall defined by the inner edge surface and the resonator outer surface. This thin wall may have about the same (e.g., within 70% or even within 35% thickness) as the average wall thickness of the hollow shell resonator. This thin wall can be referred to as a stem. However, this wall should be distinguished from conventional bulky stems of conventional resonators, which do not have cavities in the stem portion and which can be referred to as solid-stem resonators or solid-anchor resonators.

It has been found that hollow-stem resonators performed differently (and generally better) than solid-stem resonators due to the lower thermoresidual stress near the support interface component of the hollow shell resonators. Specifically, when the resonator is attached to a support substrate via an interface component material having different coefficients of thermal expansion (CTE), hollow shell resonators tend to be more flexible and less bulky (thereby causing more deflection and less thermoresidual stress) than solid-anchor resonators. Finite element method (FEM) simulations were performed on both types of resonators. In these simulations, the two types of resonators have the same distance between the center axis and the outer edge surface (a.k.a., the shell outer radius of 2.5 millimeters), the same distance between the center axis of the resonator and the edge of the inner edge surface (a.k.a., the anchor post radius of 320 micrometers), and the same size of the outer edge surface (a.k.a., the rim thickness of 70 micrometers). The same resonator material (i.e., fused silica) and the same support substrate material (i.e., silicon or borosilicate glass) were also used. Specifically, the von Mises stress of the shell resonators near the support interface component after the resonators are attached to the support substrates via the interface material at 325° C. and cooled down to room temperature (25°) was identified. It has been found that the amount of thermoresidual stress (i.e., von Mises stress caused by CTE difference between the resonator, interface material, and support substrate material after temperature change) for the solid-stem resonator is about 30% higher than for the hollow-stem resonator.

In some examples, a vibratory gyroscope comprises a hollow shell resonator, which may be also referred to as a micro-mechanical resonator. For example, the resonator may have the shape of a three-dimensional (3D) hollow half-hemispherical shell (a half-toroid). The resonator may have a hollow cylindrical stem defining a primary axis of the vibratory gyroscope. The hollow feature of the shell resonator is defined by the spacing between the resonator's inner and outer surfaces. This spacing may also be defined as a wall thickness. It should be noted that the wall thickness may vary at different portions of the hollow shell resonator. In some examples, these variations are within 70% or even within 35%.

The resonator's inner and outer surfaces also define an outer edge surface, which extends between the resonator's inner and outer surfaces, has an annulus shape, and faces the substrate's primary surface. An inner edge surface is surrounded by the resonator's inner surface and is positioned closer to the primary axis than the outer edge surface. The inner edge surface also faces the substrate's primary surface. The resonator inner surface defines a recessed region having a recessed region opening (e.g., a passthrough opening or a blind opening) extending between at least the inner edge surface, having an annulus shape, and facing the substrate primary surface. The resonator's outer surface extends to the inner edge surface (when the hollow stem has or defines a resonator passthrough opening) or is separated from the inner edge surface by the wall thickness (when the stem has or defines a resonator blind opening).

The resonator is attached to a support substrate. The resonator is attached to the support substrate through at least one of the inner or outer surfaces of this hollow stem, which differentiates vibratory gyroscopes described herein from conventional gyroscopes. Planar, vertical, and three-dimensional curved capacitive electrodes are formed on the support substrate to sense the vibration motion of the resonator and to force the resonator into resonant vibration. Other types of motion sensing methods, such as optical sensing, are also within the scope of some examples. The support substrate could be fabricated using various micro-electro-mechanical systems (MEMS) fabrication processes such as the silicon-on-glass (SOG) process and the silicon-on-insulator (SOI) process.

As noted above, the distinguishing feature of the vibratory gyroscopes described herein or, more specifically, of the gyroscopes' device structure is the attachment of the resonator's central stem to the support substrate through at least a portion of the resonator stem inner and/or outer surfaces. These surfaces may extend substantially parallel (e.g., within 10° or even within 5°) to the gyroscope's primary axis. This type of attachment (in comparison with attachment only through the resonator stem inner edge surface that faces the support substrate and extends substantially perpendicular to the gyroscope's primary axis) improves the robustness of the resonator attachment (especially under shock, vibration, and temperature variations), reduces the effect of substrate stress (induced by temperature variation or the package) on the device, and reduces the amount of acoustic energy dissipated through the hollow stem and the attachment surfaces to the supporting substrate (a.k.a. anchor loss). This attachment through the inner or outer surfaces attachment could result in the increase of the overall mechanical quality factor (Q) by reducing the transfer of acoustic energy between the support substrate and the 3D shell resonator through the hollow stem and the attachment surfaces reducing the sensitivity of Q to thermoresidual or package stress in the attachment surfaces region, and increasing of the maximum stress or the force before the resonator is detached from the support substrate. This attachment also improves the shock/vibration resistance of the attachment (at the anchor region where the resonator is attached to the support substrate) since the resonator is more solidly attached to the substrate and will not produce highly localized points of stress under shock, vibration, or large temperature swings.

Examples of Vibratory Gyroscopes

FIG. 1 illustrates one example of a hollow shell resonator 120, which has a three-dimensional (3D) half-toroid hemispherical shell shape. The hollow shell resonator 120 can be symmetrical around its primary axis 101. The hollow shell resonator 120 comprises an outer edge surface 125 (which may be also referred to as a rim), a stem 127, and a recessed region 150, extending between the outer edge surface 125 and the stem 127 and defined by the resonator outer surface 123. The stem 127 is effective protrudes in the middle of the recessed region 150 and is used for attaching the hollow shell resonator 120 to a support substrate (not shown in FIG. 1). Specifically, the stem 127 is defined by the resonator inner surface 122 (as the stem's outer surface relative to the primary axis 101) and by the resonator outer surface 123 (as the stem's inner surface relative to the primary axis 101). The stem 127 terminates with the inner edge surface 124, which can extend between the resonator inner surface 122 and the resonator outer surface 123 when the stem 127 has a resonator passthrough opening 128, e.g., as shown in FIG. 1. In this example, the inner edge surface 124 has an annulus shape. Alternatively, the stem 127 may have a resonator blind opening 129, in which case, the inner edge surface 124 is surrounded by the resonator inner surface 122 and has a circular shape (e.g., as shown in FIG. 3C below). In this example, the bottom of the stem cavity is separated from the inner edge surface 124 by a wall thickness that may deviate less than 70% or even less than 35% from the average wall thickness of the hollow shell resonator 120. For purposes of this disclosure, the wall thickness is defined as the distance between the resonator outer surface 123 and the resonator inner surface 122.

The hollow shell resonator 120 has an axisymmetric shape, meaning that the hollow shell resonator 120 is symmetric around its primary axis 101. The inner edge gap 121 can be parallel to the central longitudinal axis of the stem 127. The resonator inner surface 122 partially encloses/surrounds a recessed region 150, forming an annulus shape around the stem 127. The recessed region 150 may be curved, e.g., forming hemispherical, elliptical, or other shapes.

The stem 127, through which the hollow shell resonator 120 is attached to the support substrate 110, has the shape of a hollow tube or a cylinder with an opening 128 in the middle. Its primary axis 101 extends through this opening 128. The opening 128 can be a through opening (e.g., as shown in FIGS. 1 and 2) or a bling opening (e.g., as shown in FIGS. 3C-3E)

In some examples, this "stem" cylinder does not have a uniform diameter (within planes parallel to the X-Y plane) along its entire length (along the Z axis). For example, the diameter may increase as the distance from the inner edge surface 124 increases. The length of the stem 127 can be defined by the distance between the inner edge surface 124 and the most distant point (from the recessed region opening 152) on the resonator inner surface 122 or the resonator outer surface 123. The length of the stem 127 may be also referred to as a height and can be comparable to, shorter than, or longer than the height of the overall hollow shell resonator 120, e.g., defined by the outer edge surface 125 and the turning point (the topmost point) of the resonator outer surface 123. The turning point (the topmost point) of the resonator outer surface 123 is also the most distant point from the recessed region opening 152.

To operate as a vibratory gyroscope or, more specifically, as a mechanical vibratory gyroscope, the hollow shell resonator 120 is forced (i.e., driven) to mechanically vibrate in the flexural mode. The vibratory gyroscope 100 can be driven in the fundamental flexural modes (a.k.a. n=2 wineglass modes) because of these modes' high gyroscopic scale factor. In the n=2 wine-glass mode, the hollow shell resonator 120 vibrates such that the outer edge surface 125 (i.e., the shell rim) flexes from a circle to a first ellipse, and then back to a circle, and then to a second ellipse whose long axis is rotated 90° from that of the first ellipse. In the other n=2 wine-glass mode, the flexural mode vibration pattern is 45° rotated from the first flexural mode. This vibration pattern also shows the outer edge surface 125 (i.e., the shell rim) of the hollow shell resonator 120 going from a circle to an ellipse, then back to a circle, and then to an ellipse whose long axis is rotated 90° from the first ellipse. In each mode, the ellipses intersect at points where the outer edge surface 125 (i.e., the shell rim) does not move (called a node) and where the outer edge surface 125 (i.e., the shell rim) flexes the maximum amount (anti-node). The nodes and antinodes of the two flexural modes are rotated 45° relative to each other. The vibratory gyroscope 100 can also be operated by driving the resonator in higher flexural modes, such as n=3 wine-glass modes, n=4 wine-glass modes, etc.

Figure 2:
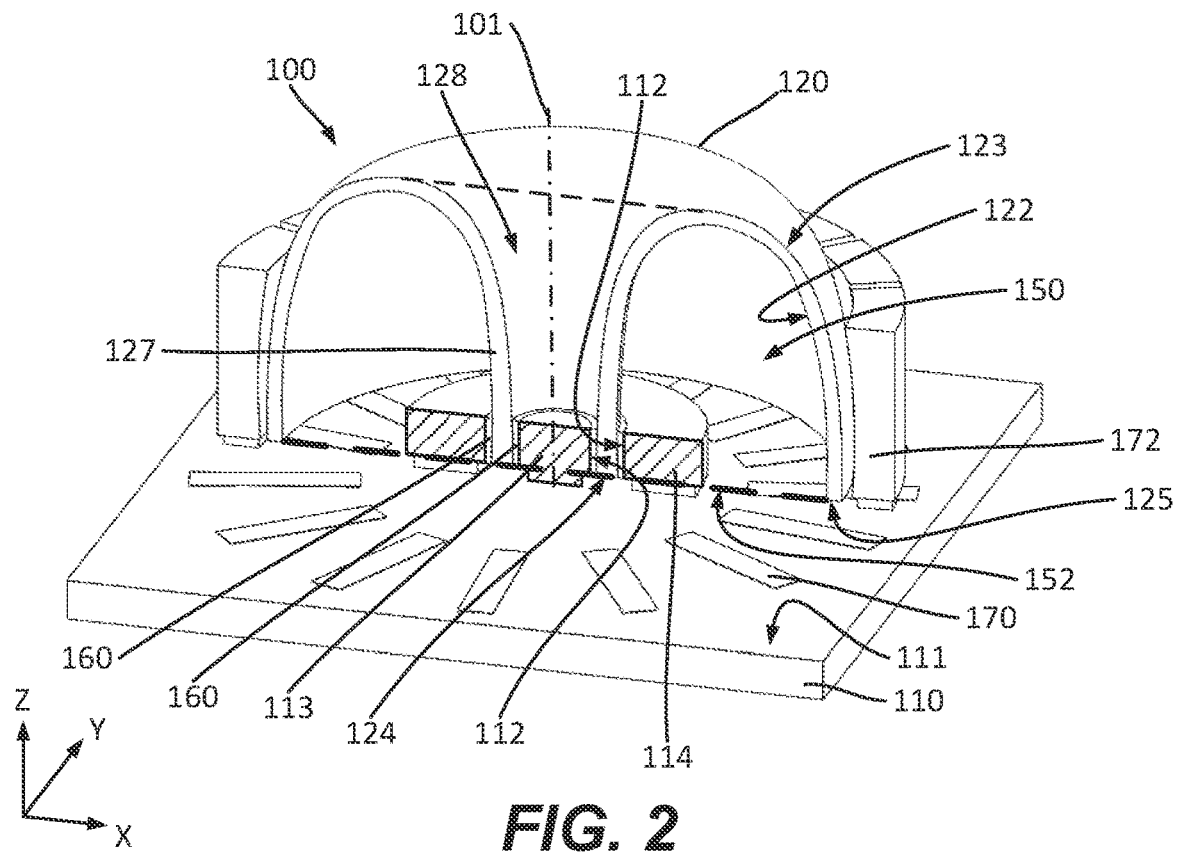
FIG. 2 is a perspective partial cross-sectional view of a vibratory gyroscope comprising a support substrate and a hollow shell resonator, supported on the substrate using the resonator's inner and outer surfaces, in accordance with some examples.

FIG. 2 is a schematic partial cross-sectional view of vibratory gyroscope 100, in accordance with some examples. This type of a vibratory gyroscope can be also referred to as a 3D-shell resonator gyroscope. Overall, a vibratory gyroscope comprises a mechanical resonator (operable as a vibrating mass) and electrodes that excite and measure the vibrating motions of the mechanical resonator. Vibratory gyroscopes measure rotation rates (or angles) by detecting the amounts of the Coriolis Force. The Coriolis Force is proportional to the rotation rate and vibrating velocity, effective mass, and angular gain of a mechanical resonator. The mechanical resonator has one or multiple mechanical resonance modes that can be excited by (i.e., mechanically coupled by) the Coriolis Force. Many existing vibratory gyroscopes, such as microelectromechanical systems (MEMS) gyroscopes, have planar mechanical resonators made with a flat substrate. 3D shell resonator gyroscopes can be more desirable than planar resonator gyroscopes due to potentially better structural symmetry, higher mechanical quality factor, and better shock and vibration insensitivity.

The vibratory gyroscope 100 (shown in FIG. 2) comprises a 3D shell resonator 120, and a support substrate 110. The vibratory gyroscope 100 also comprises primary surface capacitive electrodes 170 and side capacitive electrodes 172, both of which can be formed from a conductive material and placed either underneath the outer edge surface 125 (i.e., the primary surface electrodes 170) on the support substrate 110 and/or around the resonator inner surface 122 (not shown) or the resonator outer surface 123 near the outer edge surface 125 (i.e., the side capacitive electrodes 172). The outer edge surface 125 does not touch the support substrate 110 or either of the primary surface capacitive electrodes 170 or the side capacitive electrodes 172. Instead, the outer edge surface 125 is separated (from the substrate and electrodes) from them by a gap (e.g., 0.1-200 micrometers or, more specifically, 10-100 micrometers). This gap is sometimes referred to as an air gap even though the interior of the vibratory gyroscope 100 surrounding the hollow shell resonator 120 can be a vacuum environment.

In some examples, the hollow shell resonator 120 is attached (anchored) to the support substrate 110 or, more specifically, to the resonator support surface 112 of the support substrate 110 using one or more support interface components 160. Some examples of such support interface components 160 include metal solder (e.g., gold/tin (Au/Sn) solder, gold/indium (Au/In) solder), sintering metal nanoparticles (e.g., gold (Au) nanoparticles, silver (Ag) nanoparticles, copper (Cu) nanoparticles), conductive epoxy, and glass frit.

As noted above, the stem 127 of the hollow shell resonator 120 is hollow. The inner edge surface 124 of stem 127 can be either open (i.e., the stem opening 128 is a through opening) or closed (i.e., the stem opening 128 is a blind opening). When the inner edge surface 124 is closed, the inner edge surface 124 has the shape of a flat circle located at the center of the hollow shell resonator 120, which is substantially parallel to the substrate primary surface 111 and connects the non-parallel regions of the resonator inner surface 122. When the inner edge surface 124 is open, the inner edge surface 124 has the shape of a ring parallel to the substrate primary surface 111 near the center of the hollow shell resonator 120 and connects the resonator inner surface 122 and resonator outer surface 123. The shell stem 127 can be attached to the resonator support surface 112 either through a portion of the resonator outer surface 123, a portion of the resonator inner surface 122, the inner edge surface 124, or through any combination of these three surface portions, as will be described later. There are significant advantages to attaching the hollow shell resonator 120 to the support substrate 110 through at least a portion of the resonator inner surface 122 or a portion of the resonator outer surface 123 as described above with reference to the side attachment (vs. the bottom attachment).

Figure 3A:
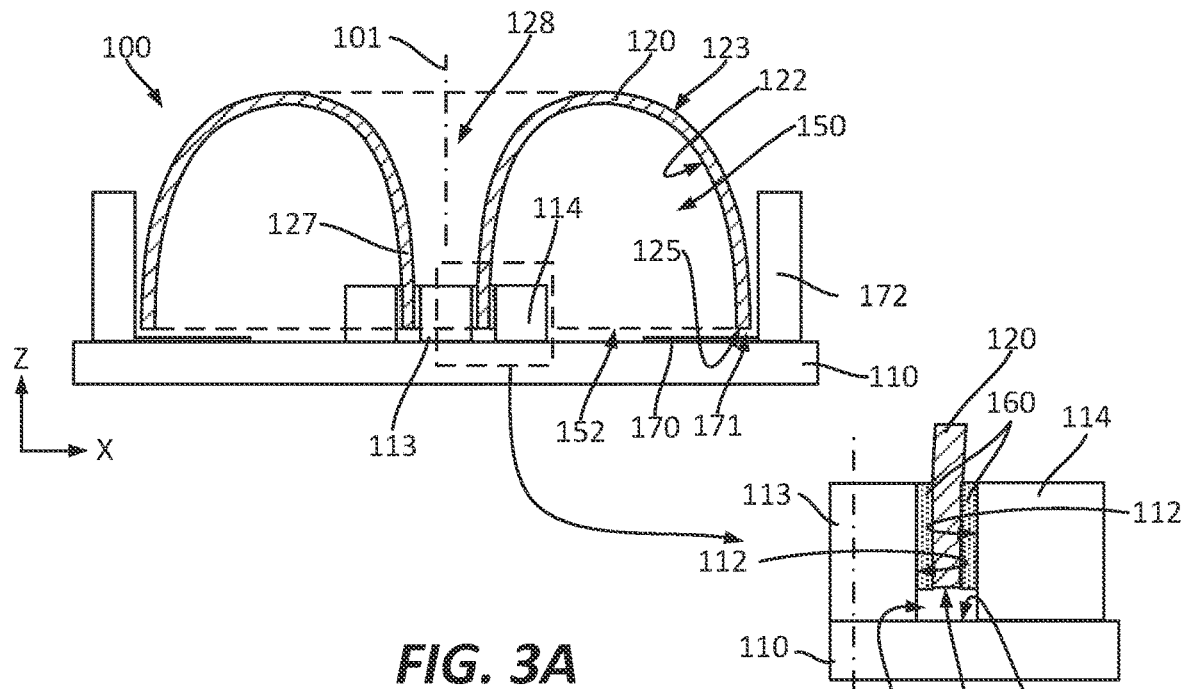
FIGS. 3A-3E are cross-sectional side views of a vibratory gyroscope illustrating different types of support substrates and stem ends, in accordance with some examples.
Figure 3B:
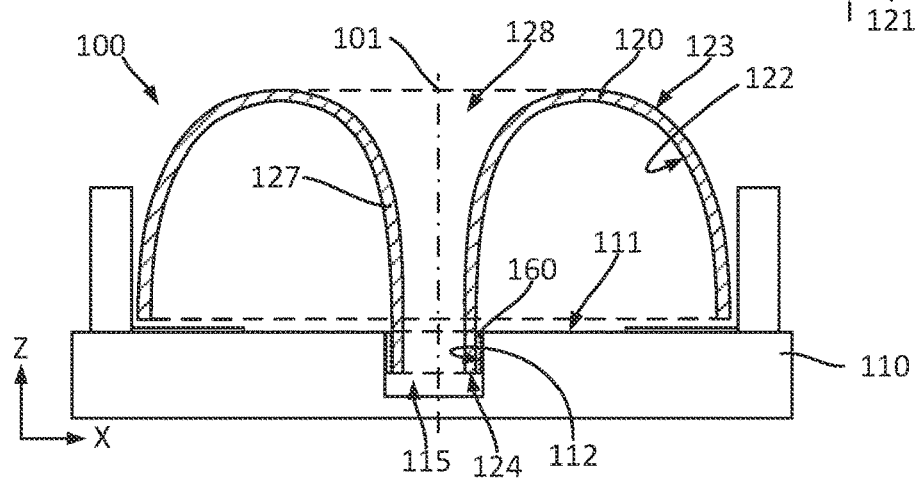
Figure 3C:
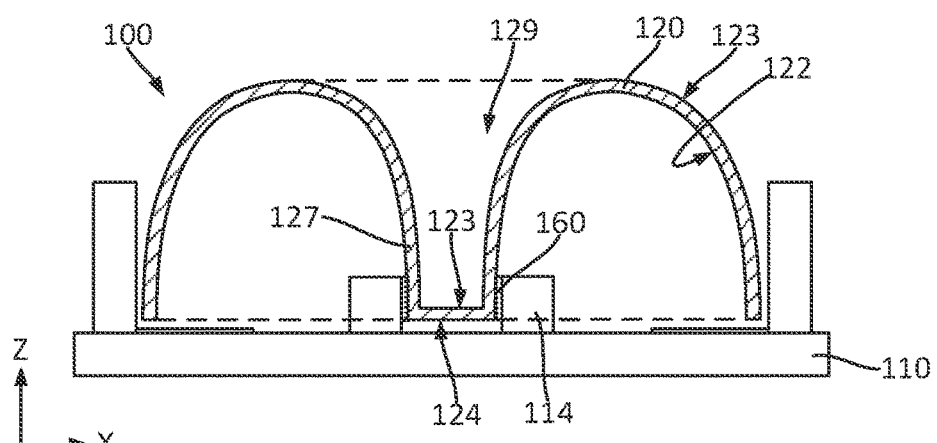
Figure 3D:
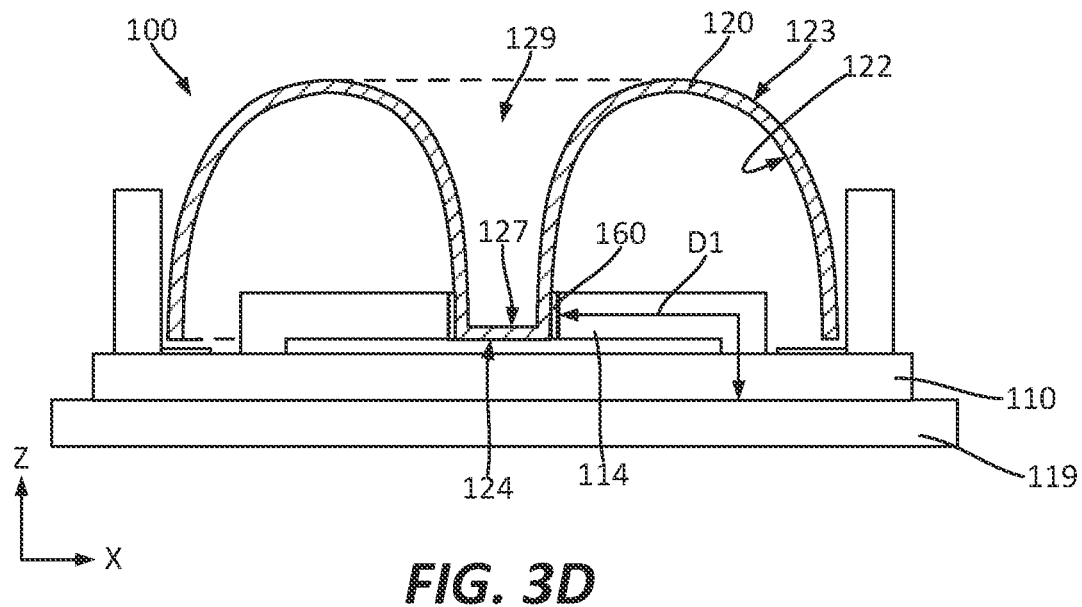
Figure 3E:
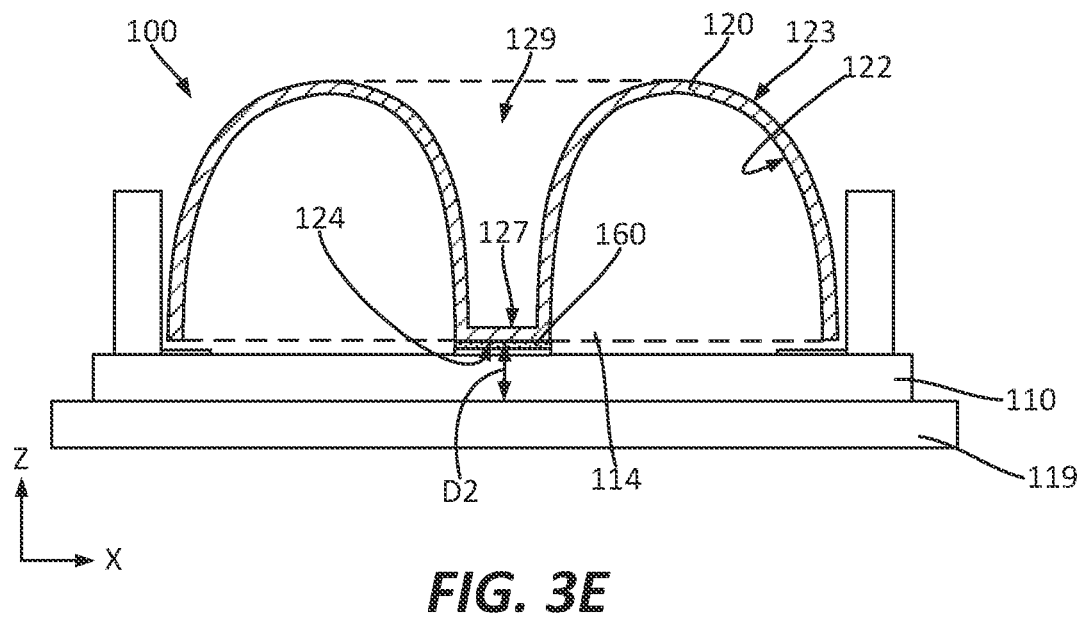

FIGS. 3A-3E show cross-sectional views of a few examples of the vibratory gyroscope 100 (e.g., a 3D shell resonator gyroscope) with different attachments between the support substrate 110 and hollow shell resonator 120. Specifically, FIG. 3A shows an example of the cross-section of the vibratory gyroscope 100, in which the shell stem 127 is a hollow stem with an open-end face (i.e., an open-ended hollow stem). The shell stem 127 is attached to the resonator support surface 112 formed by a portion of the inner support protrusion 113 and the outer support protrusion 114. Specifically, the resonator inner surface 122 faces and is attached to the outer support protrusion 114, while the resonator outer surface 123 faces and is attached to the inner support protrusion 113. The support interface components 160 can be used for this attachment, e.g., one support interface component 160 positioned between and connecting the resonator inner surface 122 and the outer support protrusion 114, another support interface component 160 positioned between and connecting the resonator outer surface 123 and the inner support protrusion 113. In this FIG. 3A example, the inner edge surface 124 is separated from the substrate primary surface 111 by an inner edge gap 121. The outer edge surface 125 is separated from the substrate primary surface 111 by the primary surface electrode gap 171. In some examples, the inner edge gap 121 is the same as the primary surface electrode gap 171. Alternatively, the inner edge gap 121 is different than the primary surface electrode gap 171. This stem attachment configuration is also shown in FIG. 2 and further described below with reference to FIG. 4C. Some potential benefits of these attachment examples (e.g., shown in FIG. 2 and FIG. 4C, over other examples) include better shock resistance because the stem 127 is mechanically supported from both resonator inner and outer surfaces.

FIG. 3B shows an example of the vibratory gyroscope 100 (e.g., a 3D shell resonator gyroscope) with the open-ended stem 127 attached to the support substrate 110 only through at the resonator inner surface 122, i.e., a portion of the resonator inner surface 122 proximate to the inner edge surface 124. It should be noted that the resonator inner surface 122 can also be viewed as the outer surface of the stem 127. In this example, the resonator support surface 112 is in a recess 115 with the support substrate 110, i.e., the recess 115 extending below the substrate primary surface 111. Specifically, the inner edge surface 124 extends into the recess 115. Some potential benefits of this example (in FIG. 3B) are easier microfabrication processes (e.g., versus the example in FIG. 3A), lower thermoresidual stress at the resonator support surface (e.g., versus the example in FIG. 3C). Specifically, the 3D hollow shell resonator has a smaller mechanical stiffness near the resonator support surface, which helps to reduce the stress.

FIG. 3C shows an example of the vibratory gyroscope 100 (e.g., a 3D shell resonator gyroscope) with the closed-ended stem 127 that is attached to the outer support protrusion 114. Specifically, the resonator inner surface 122 faces the outer support protrusion 114 and is attached to the outer support protrusion 114 using a support interface component 160. In this example, the outer support protrusion 114 is positioned above the substrate primary surface 111 such that the inner edge surface 124 also protrudes above the substrate primary surface 111. Some potential benefits of the attachment example in FIG. 3C is a simpler microfabrication process (versus the one in FIG. 3A) and has better shock resistance because of the larger mechanical stiffness of the 3D hollow shell resonator near the resonator support surface (versus the one in FIG. 3B).

FIG. 3D shows the cross-section of another example of vibratory gyroscope 100 in which outer support protrusion 114 has an offset (along the X-axis) between the interface with support interface component 160 and support substrate 110. In some examples, this offset (along the X-axis) is between 0.01-10 millimeters or, more specifically, between 0.1-5 millimeters, depending on the size of a 3D shell resonator. For example, for a 3D shell resonator with a diameter of 5 millimeters, the value could be 10 micrometers to 4.5 millimeters). In this example, support substrate 110 is shown to be connected to outer case 119. The connecting distance between the interface of hollow shell resonator 120 and support interface component 160 and outer case 119, which is provided by a combination of outer support protrusion 114 and support substrate 110 is identified as D1. In some examples, this connecting distance (D1) is between 0.01-10 millimeters or, more specifically, between 0.1-5 millimeters, depending on the size of a 3D shell resonator. For example, a 3D shell resonator with a diameter of 5 millimeters may have a connecting distance (D1) of millimeters or, more specifically, 0.1-3 millimeters. It should be noted that this connecting distance (D1) extends along both the X-axis and the Z-axis and depends on the thickness of the support substrate 110. As a reference, the thickness of support substrate 110 is between 0.01-10 millimeters or, more specifically, between 0.1-5 millimeters, depending on the size of a 3D shell resonator. For example, for a 3D shell resonator with a diameter of 5 millimeters, this value could be 0.1-2 millimeters.

FIG. 3E shows the cross-section of yet another example of vibratory gyroscope 100 in which support interface component 160 is positioned between the inner edge surface 124 and support substrate 110. In this example, the connecting distance between the interface of the hollow shell resonator 120 and support interface component 160 and the outer case 119 (identified as D2) is a combination of the thickness of interface component 160 and the thickness of support substrate 110. In some examples, this connecting distance (D2) is between 0.01-10 millimeters or, more specifically, between 0.1-5 millimeters depending on the size of a 3D shell resonator. For example, for a 3D shell resonator with a recessed region diameter of 5 millimeters, this value could be 0.1-2 millimeters.

Figure 4A:
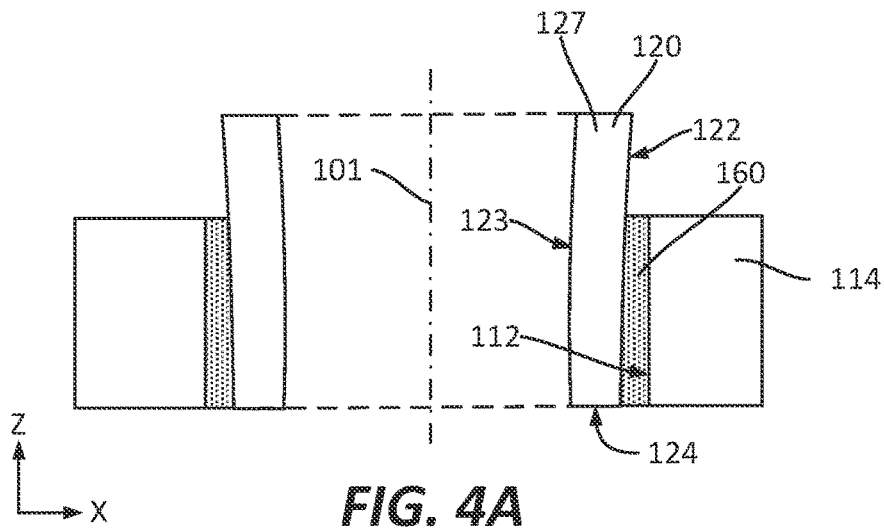
FIGS. 4A-4C are cross-sectional side views of different types of attachments between the resonator's inner and outer surfaces and the support substrates, in accordance with some examples.
Figure 4B:
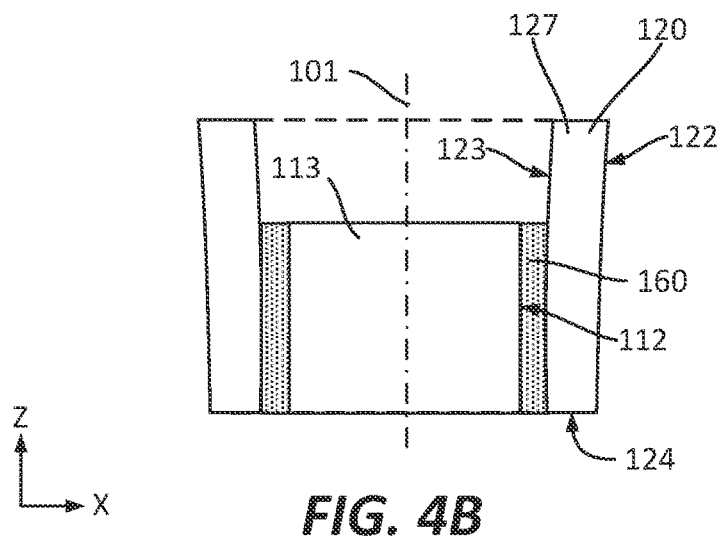
Figure 4C:
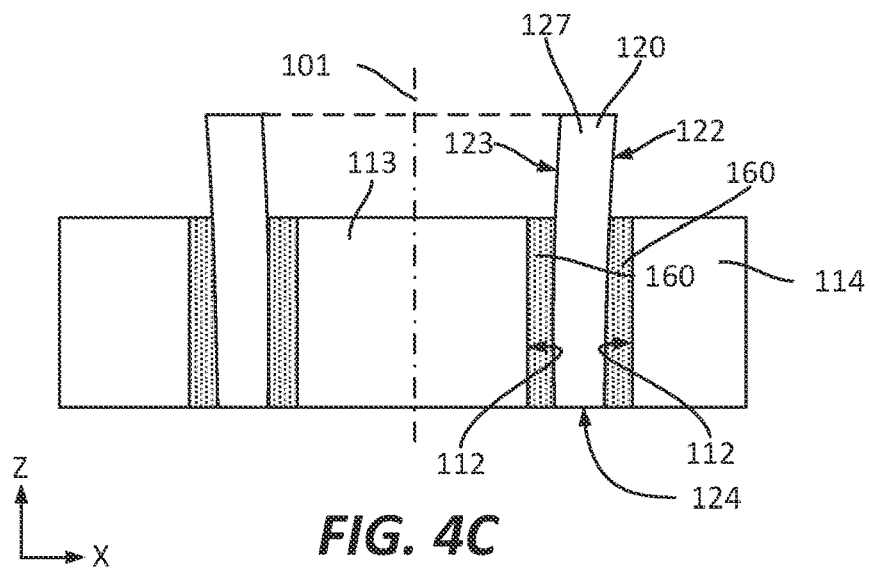

FIGS. 4A-4C show examples of various resonator stem attachment schemes highlighting the geometrical relationship between the shell stem 127, support interface component 160, resonator support surface 112, outer support protrusion 114, and inner support protrusion 113. It should be noted that the inner support protrusion 113 and/or outer support protrusion 114 can be also replaced with the recess 115 (as described above with reference to FIG. 3B.

FIG. 4A shows the close-up view of an example where a portion of the resonator inner surface 122 of an open-ended stem 127 is attached to the resonator support surface 112 of the outer support protrusion 114 using the support interface component 160. The resonator stem 127 can also be a close-ended stem. The stem 127 can be also attached to the resonator support surface 112 defined in a recess 115 formed in the support substrate 110, instead of a support protrusion formed on or attached to the support substrate 110.

FIG. 4B shows the close-up view of another example where a portion of the resonator outer surface 123 is attached to the resonator support surface 112 of the inner support protrusion 113 using the support interface component 160. The stem 127 can be also attached to the resonator support surface 112 defined in a recess 115 formed in the support substrate 110, instead of a support protrusion formed on or attached to the support substrate 110.

FIG. 4C shows the close-up view of another example where a portion of the resonator inner surface 122 and a portion of the resonator outer surface 123 are attached to the substrate's outer support protrusion 114 and the substrate's inner support protrusion 113, respectively, using the support interface component 160. This example was described above with reference to FIG. 3A. The stem 127 can be also attached to the resonator support surface 112 defined in a recess 115 formed in the support substrate 110, instead of a support protrusion formed on the support substrate 110.

Figure 5A:
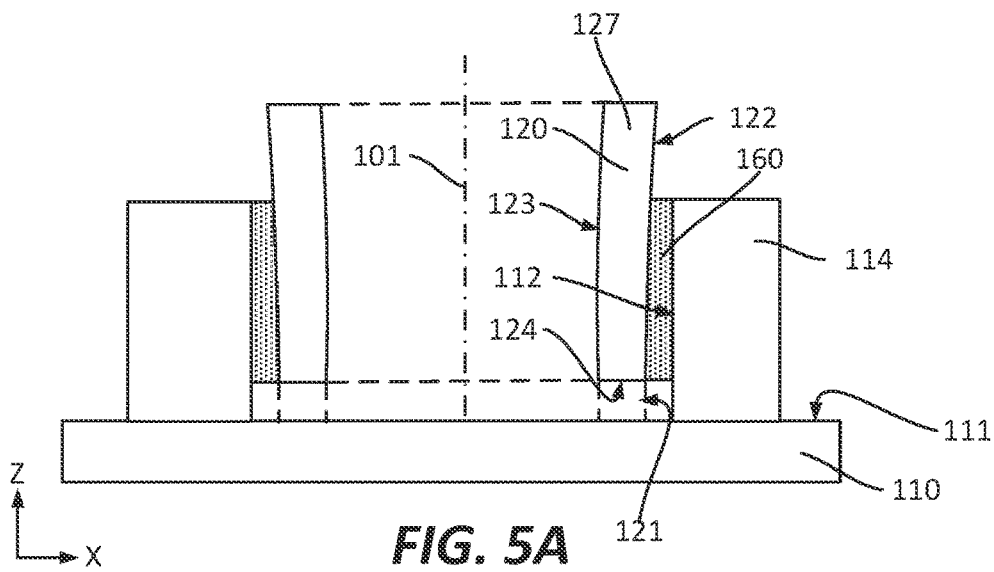
FIGS. 5A-5F are cross-sectional side views of different types of attachments between the resonator surfaces and the support substrate, in accordance with some examples.

FIGS. 5A-5F show examples of the stem attachment schemes highlighting the relationship between the geometrical relationship between the stem 127, inner edge surface 124, support interface component 160, resonator support surface 112, inner support protrusion 113, outer support protrusion 114, support substrate 110, and inner edge gap 121. Specifically, FIG. 5A shows the close-up view of another example where a portion of the resonator inner surface 122, which is the outer surface of the hollow stem 127, is attached to the resonator support surface 112 of the outer support protrusion 114 using the support interface component 160. The inner edge surface 124 is separated from the substrate primary surface 111 by a controlled gap called the inner edge gap 121.

Figure 5B:
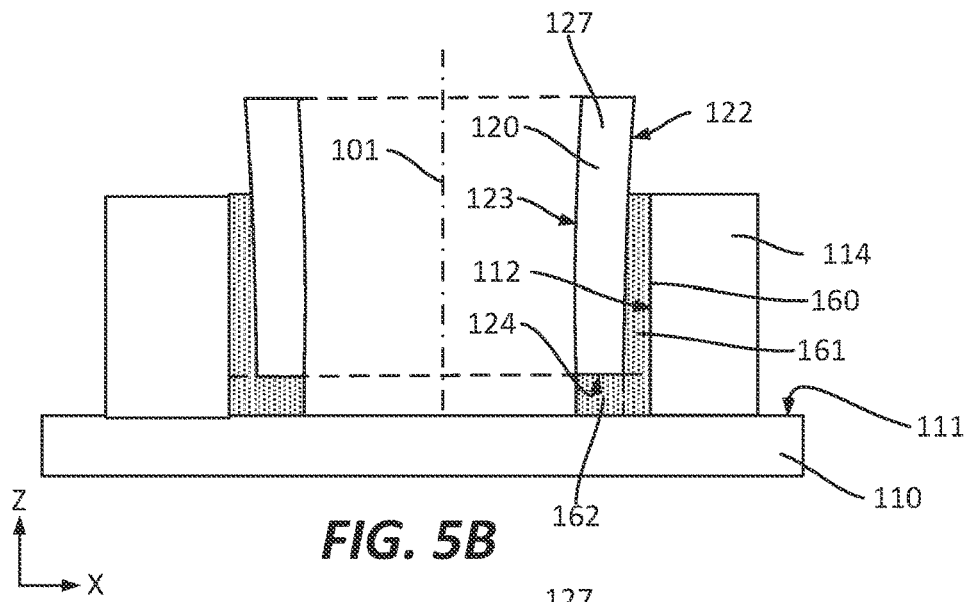

FIG. 5B shows the close-up view of another example where a portion of the resonator inner surface 122 of the open-ended hollow stem 127 is attached to the resonator support surface 112 of the outer support protrusion 114 (using the first component portion 161 of the support interface component 160) and at least a portion of the inner edge surface 124 of the open-ended hollow stem 127 is attached to the substrate primary surface 111 (using the second component portion 162 of the support interface component 160). In other examples, the resonator hollow stem 127 can also be a closed-ended hollow stem.

Figure 5C:
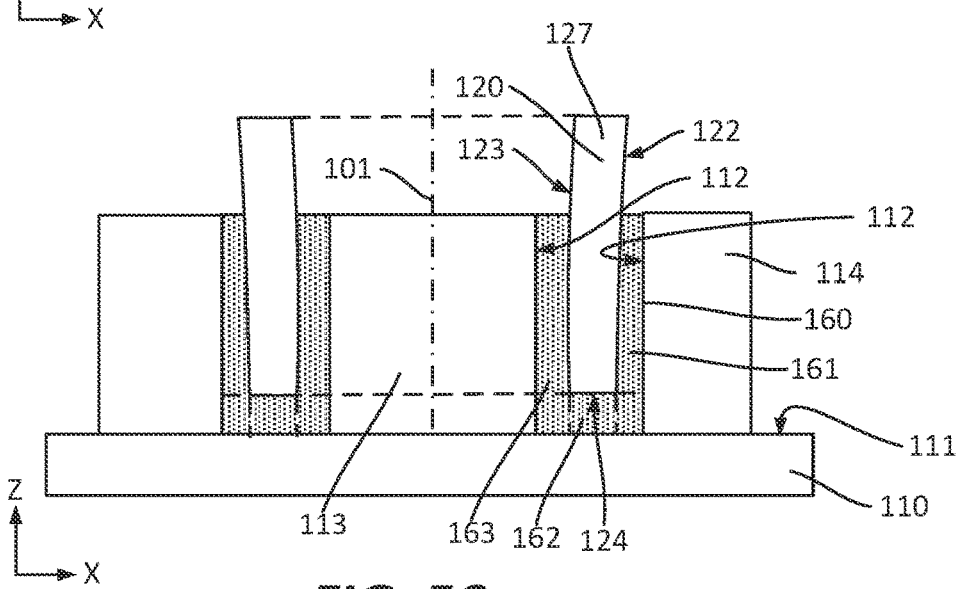

FIG. 5C shows the close-up view of another example where a portion of the resonator inner surface 122 and a portion of the resonator outer surface 123 of the open-ended hollow stem 127 are attached to the resonator support surfaces 122 on the outer support protrusion 114 and the inner support protrusion 113, respectively, using the first component portion 161 of the support interface component 160 and the third component 163 of the support interface component 160. Furthermore, at least a portion of the inner edge surface 124 of the hollow stem 127 is attached to the substrate primary surface 111 using the second component portion 162 of the support interface component.

Figure 5D:
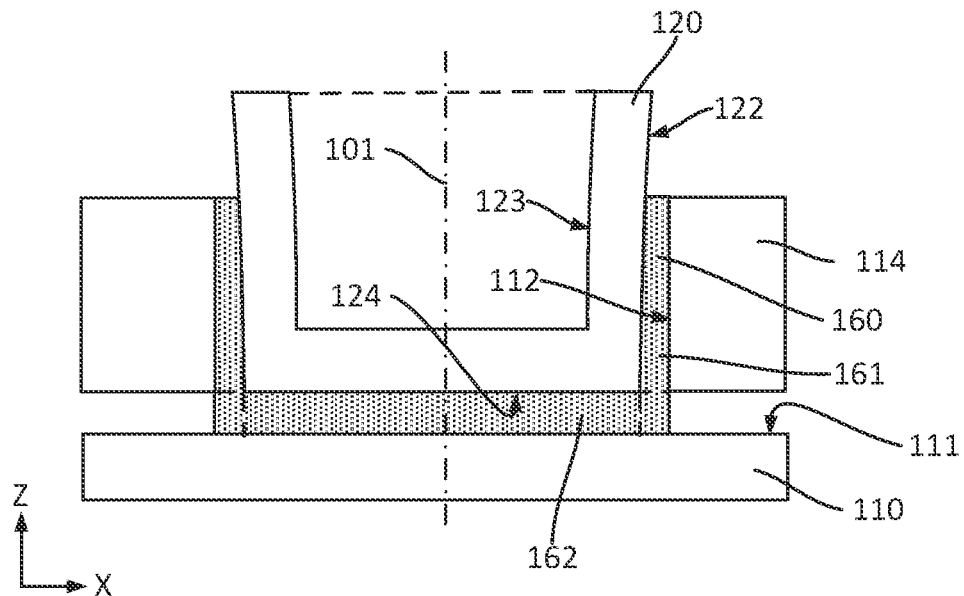

FIG. 5D shows the close-up view of another example where a portion of the resonator inner surface 122 of the closed-ended hollow stem 127 is attached to the resonator support surface 112 on the outer support protrusion 114 using the first component portion 161 of the support interface component 160. Furthermore, the entire surface of the inner edge surface 124 of the closed-ended hollow stem 127 is attached to the substrate primary surface 111 using the second component portion 162 of the support interface component 160.

Figure 5E:
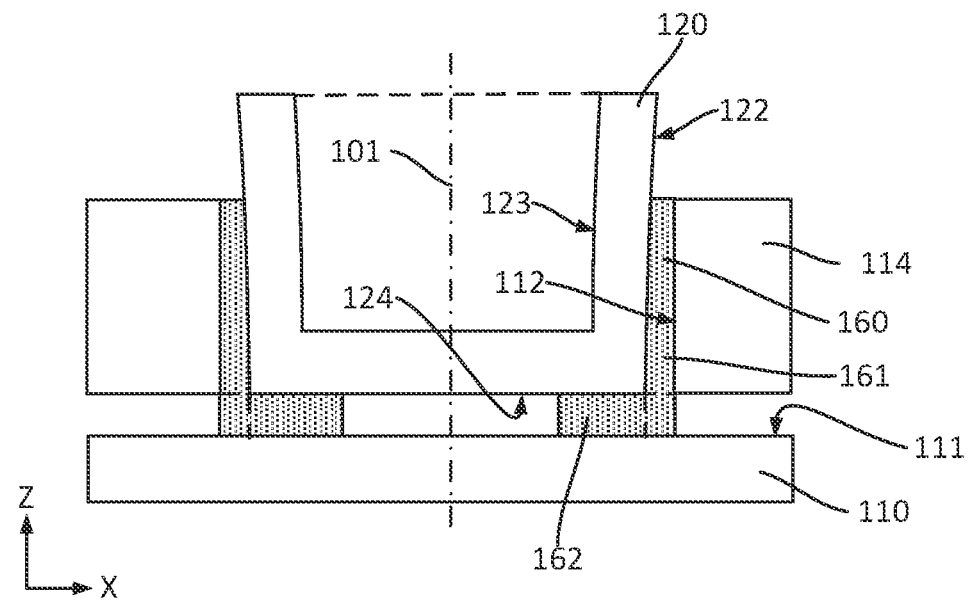

FIG. 5E shows the close-up view of another example where a portion of the resonator inner surface 122 of the closed-ended hollow stem 127 is attached to the resonator support surface 112 on the outer support protrusion 114 using the first component portion 161 of the support interface component 160. Furthermore, a portion of the inner edge surface 124 of the closed-ended hollow stem 127, which is away from its primary axis 101, is attached to the substrate primary surface 111 using the second component portion 162 of the support interface component 160.

Figure 5F:
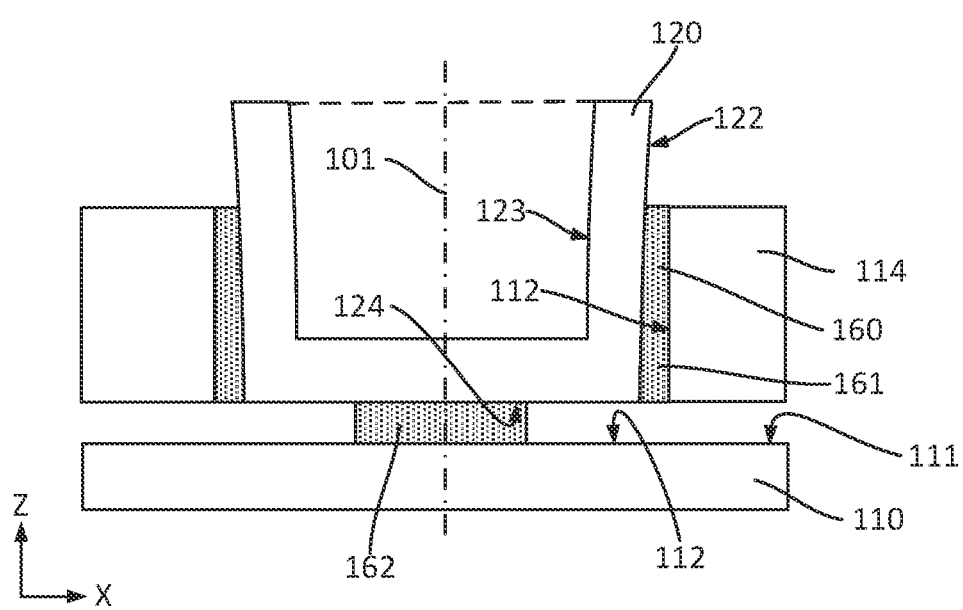

Finally, FIG. 5F shows the close-up view of another example where a portion of the resonator inner surface 122 of the closed-ended hollow stem 127 is attached to the resonator support surface 112 on the outer support protrusion 114 using the first component portion 161 of the support interface component 160. Furthermore, a portion of the inner edge surface 124, closest to/surrounding/including the primary axis 101 of the closed-ended hollow stem 127 is attached to the substrate primary surface 111 using the second component portion 162 of the support interface component 160.

Overall, attaching the hollow shell resonator 120 to the support substrate 110 through at least a portion of the resonator inner surface 122 and/or the resonator outer surface 123 is desirable due to lower anchor loss, higher mechanical Q, lower temperature sensitivity, lower acoustic energy transmission between the support substrate to the resonator through the hollow stem and the attachment surfaces, lower thermal stress transmission from the support substrate to the resonator through the attachment surfaces, and significantly improved mechanical support during shock or vibration events that prevent high levels of mechanical stress regions where the shell is attached to the substrate. Some of these benefits are described above.

The Q factor for a micromechanical resonator is affected by anchor loss, material quality, thermoelastic damping, phonon-phonon dissipation, air damping, and surface loss. The Q of a micromechanical resonator made of an amorphous material such as amorphous fused-silica or a single-crystal material such as single-crystal silicon at a vibrating frequency (f) lower than 1 MHz at an ambient pressure less than a few milli Torr tends to be dominated by anchor loss, surface loss, and thermoelastic damping.

When a 3D shell resonator is vibrating (moving) in the flexural resonance mode, the hollow stem is also vibrating (moving, deflecting) in the flexural resonance mode although the vibration amplitude of the hollow stem is significantly smaller than that of the outer edge surface (i.e., the resonator rim). The deflection amplitudes of different locations within the hollow stem have a strong dependence on the radial distance from the primary axis at the center of the device. The deflection amplitude is the largest at a location furthest from the primary axis and vice versa. The deflection amplitudes of different locations within the hollow stem are a weak function in the direction parallel to the primary axis.

When the hollow stem of a 3D shell resonator is attached to the support substrate only from the inner edge surface, non-uniform stress is developed in the radial direction in the inner edge surface when the resonator is deflecting in a flexural mode. Large stress is developed at the location furthest from the primary axis and almost no stress is developed near the center of the device.

When the hollow stem is attached from the sidewall surfaces to the support substrate, the radial distances from the primary axis to all locations within the resonator support surfaces are nearly the same, and uniform stress is developed at all locations of the resonator support surface. When a resonator deflects in the flexural mode, the maximum stress developed in the hollow stem close to the resonator support surface is smaller than the maximum stress when the hollow stem is attached only from the inner edge surface to the support substrate.

When the hollow stem is attached to the support substrate from both the sidewall surface and the inner edge surface to the support substrate, the maximum stress developed in the hollow stem near the resonator support surface is smaller than when the hollow stem is attached to the support substrate only from the inner edge surface. This is because improved mechanical support is provided from the resonator support surface on the sidewall of the hollow stem.

In all of the configurations shown in these figures, the shell is attached to the substrate in the attachment regions throughout the entire perimeter of the hollow stem. In other words, the attachment surface surrounds the entire stem and extends up the stem by some distance. FIGS. 6A-6B and 7A-7B show two more different configurations whereby the hollow shell resonator 120 can be attached to the support substrate 110 by modifying the design of the resonator support surface 112.

Figures 6A, 6B:
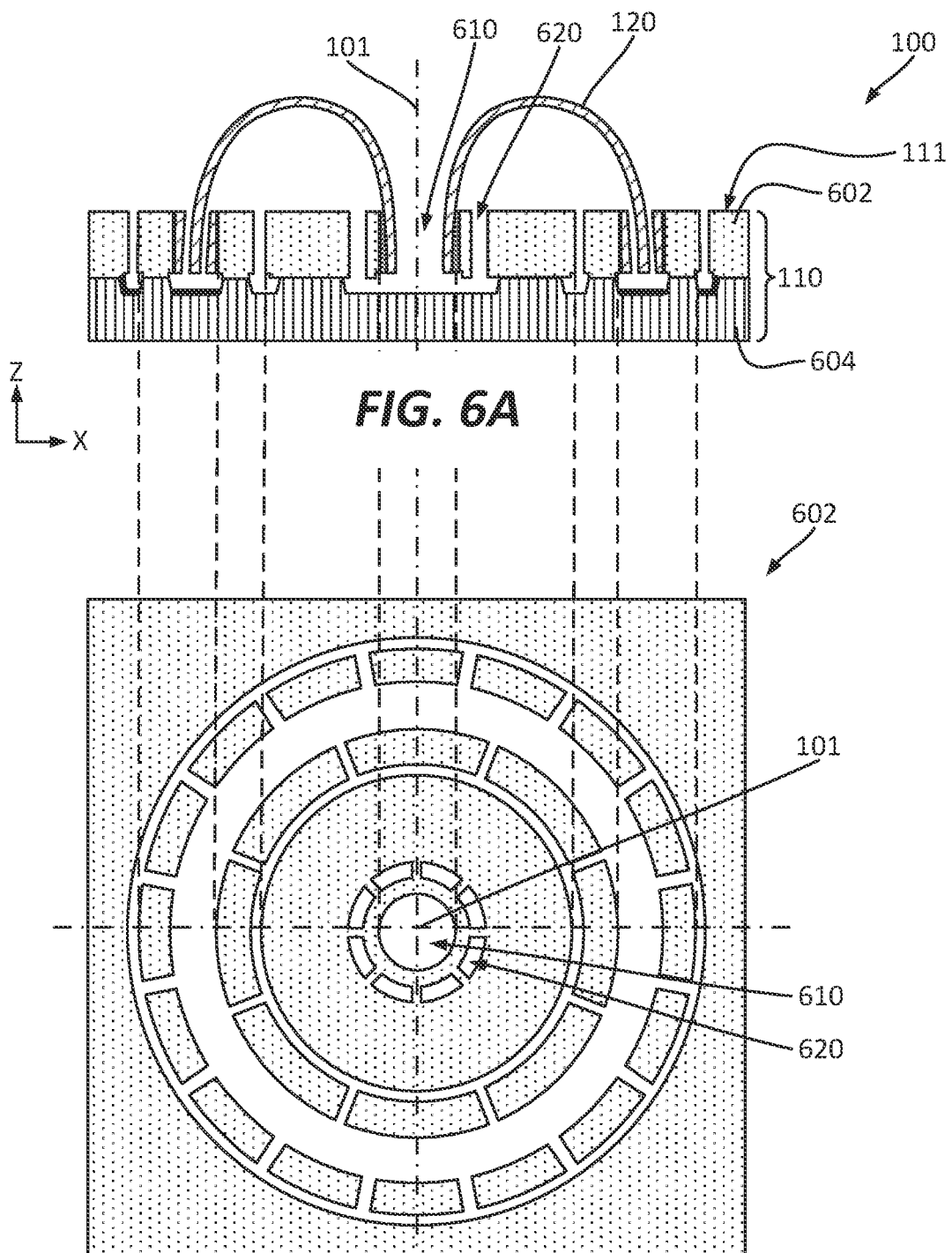
FIG. 6A is a cross-sectional side view of a vibratory gyroscope comprising a support substrate and a hollow shell resonator, illustrating the various openings in the support substrate, in accordance with some examples.
FIG. 6B is a top view of the support substrate of the vibratory gyroscope shown in FIG. 6A, in accordance with some examples.

FIGS. 6A-6B show a modified arrangement for the vibratory gyroscope 100 support attachment surfaces. Specifically, FIG. 6A illustrates a side cross-sectional view of a vibratory gyroscope 100 comprising a support substrate 110 and hollow shell resonator 120 such that the support substrate 110 has two portions, i.e., a first substrate portion 602 and a second substrate portion 604. The first substrate portion 602 is used for attaching the hollow shell resonator 120 or, more specifically, to the sidewall surface of the hollow stem (which could be closed-ended or open-ended). The second substrate portion 604 is attached to the first substrate portion 602 and provides support for the electrodes.

FIG. 6B illustrates a top view of the first substrate portion 602 showing various openings in the first substrate portion 602. Specifically, the first substrate portion 602 comprises a first opening 610 where the stem of the hollow shell resonator 120 protrudes. The first opening 610 provides the resonator support surface for attaching the stem. The first substrate portion 602 also comprises a second set of opening 620, selectively removed between a part supporting the stem and the part positioned on the other sides of the second set of opening 620. The second set of opening 620 provides stress isolation between these parts or, more generally, between the support substrate 110 and the hollow shell resonator 120 thereby reducing the amount of energy loss from the hollow shell resonator 120 to the support substrate 110, thus increasing the Q. Similar structural designs (to the one shown in FIG. 6A-6B) can be made for the inner support protrusion or a recess of the support substrate.

Figures 7A, 7B:
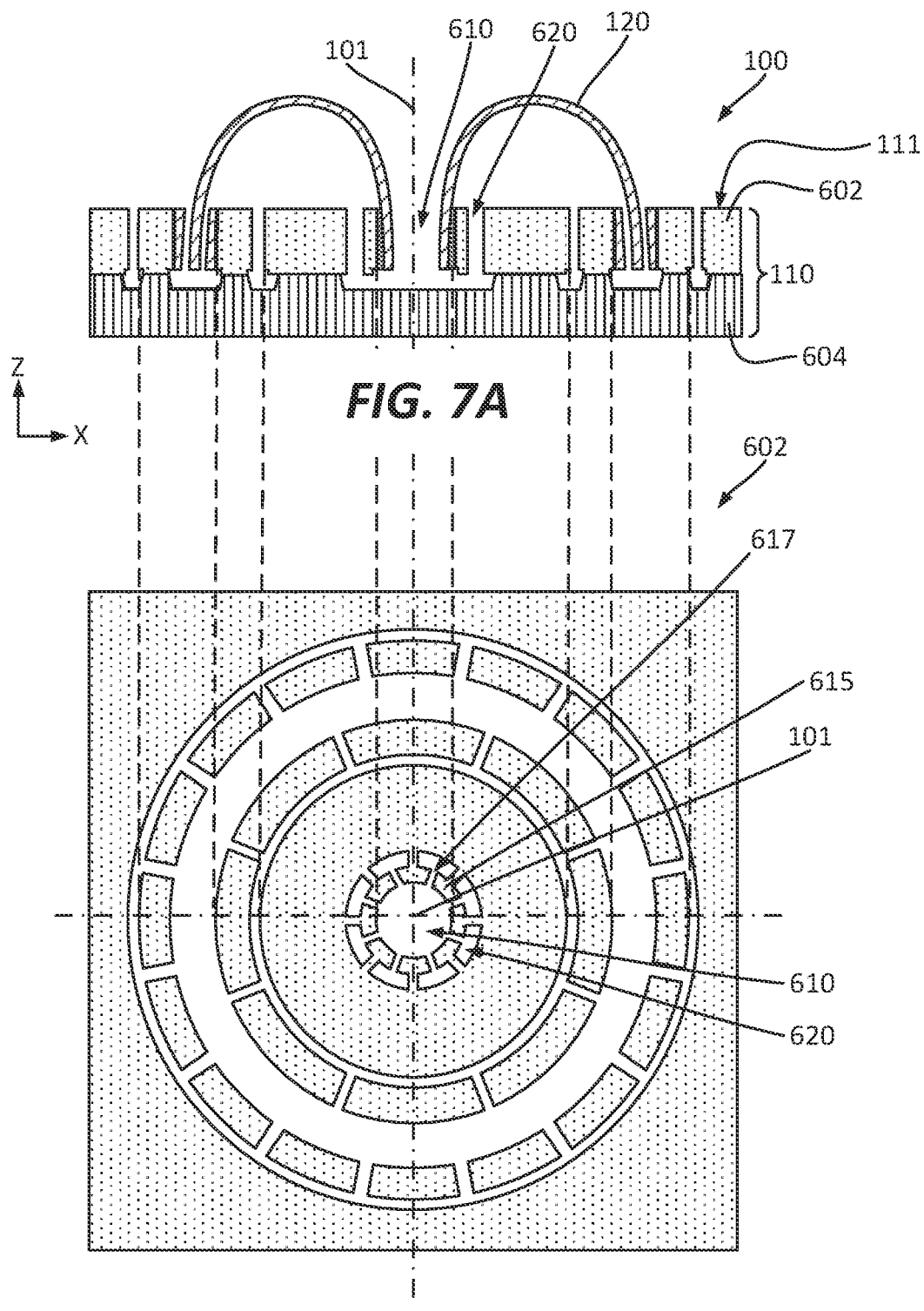
FIG. 7A is a cross-sectional side view of a vibratory gyroscope comprising a support substrate and a hollow shell resonator, illustrating the various openings in the support substrate, in accordance with some examples.
FIG. 7B is a top view of the support substrate of the vibratory gyroscope shown in FIG. 7A, in accordance with some examples.

FIGS. 7A-7B illustrate another example of the vibratory gyroscope 100. Specifically, FIG. 7A illustrates a side cross-sectional view of a vibratory gyroscope 100 comprising a support substrate 110 and hollow shell resonator 120 such that the support substrate 110 has two portions, i.e., a first substrate portion 602 and a second substrate portion 604. The first substrate portion 602 is used for attaching the hollow shell resonator 120 or, more specifically, to the sidewall surface of the hollow stem (which could be closed-ended or open-ended). The second substrate portion 604 is attached to the first substrate portion 602 and provides support to the electrodes. Referring to FIG. 7B, unlike the example in FIG. 6B, the part of the first substrate portion 602 between the first opening 610 and the second set of opening 620 is now segmented and may be referred to as segmented portions 615. In other words, the first opening 610 and the second set of opening 620 are interconnected by additional openings 617 that segment this part of the first substrate portion 602. These segmented portions 615 are used to support the hollow shell resonator 120 around the perimeter of the hollow stem (in this case the attachments are shown on the inside sidewall of the resonator facing the recessed region, although the attachment could also be on the outside or both inside and outside sidewalls) only in selected segments. The segments are attached to the portion of the protrusion that is attached to the substrate's primary surface, using extended beams, or springs. This configuration further provides mechanical isolation between the shell resonator and the support substrate reduces anchor loss and increases Q, and also reduces the effects of stress induced in the substrate on the performance of the shell. FIG. 7B shows the top view of the segmented portions of the attachment region to more clearly illustrate their geometry.

The 3D shell micro resonator gyroscope with an attachment scheme from at least a sidewall portion of the hollow stem can be fabricated in a number of different ways by using MEMS fabrication processes, including but not limited to the silicon-on-glass (SOG) process or the silicon-on-insulator (SOI) process.

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A vibratory gyroscope comprising:
a primary axis;

a support substrate comprising a substrate primary surface and a resonator support surface, extending substantially perpendicular to the substrate primary surface; and a hollow shell resonator comprising a resonator inner surface, a resonator outer surface, an inner edge surface, and an outer edge surface, wherein:

the resonator outer surface is opposite of and separated by a wall thickness from the resonator inner surface, the outer edge surface extends between the resonator inner surface and the resonator outer surface, having an annulus shape, and facing the substrate primary surface, the inner edge surface is surrounded by the resonator inner surface, positioned closer to the primary axis than the outer edge surface, and facing the substrate primary surface, the resonator inner surface defines a recessed region having a recessed region opening extending between the outer edge surface and the inner edge surface, having an annulus shape, and facing the substrate primary surface, the resonator outer surface extends to the inner edge surface or is separated from the inner edge surface by the wall thickness, and at least one of the resonator inner surface and the resonator outer surface is attached to the resonator support surface of the support substrate adjacent to the inner edge surface.

2. The vibratory gyroscope of claim 1, wherein the resonator outer surface extends to the inner edge surface and defines a resonator passthrough opening such that the inner edge surface has an annulus shape and surrounds the resonator passthrough opening.

3. The vibratory gyroscope of claim 1, wherein the resonator outer surface is separated from the inner edge surface by the wall thickness and defines a resonator blind opening such that the inner edge surface has a circular shape defined by the resonator inner surface.

4. The vibratory gyroscope of claim 1, wherein the resonator inner surface is attached to the resonator support surface of the support substrate.

5. The vibratory gyroscope of claim 4, wherein the resonator support surface, to which the resonator inner surface is attached, is formed by an outer support protrusion, extending from the substrate primary surface substantially parallel to the primary axis.

6. The vibratory gyroscope of claim 4, wherein the resonator support surface, to which the resonator inner surface is attached, is formed by a substrate recess extending from the substrate primary surface along the primary axis.

7. The vibratory gyroscope of claim 4, wherein the resonator outer surface is further attached to the resonator support surface of the support substrate formed by an inner support protrusion, extending from the substrate primary surface along the primary axis.

8. The vibratory gyroscope of claim 4, wherein the resonator outer surface is not attached and spaced away from the resonator support surface of the support substrate.

9. The vibratory gyroscope of claim 4, wherein the resonator outer surface is attached to the resonator support surface of the support substrate while the resonator inner surface is not attached and spaced away from the resonator support surface of the support substrate.

10. The vibratory gyroscope of claim 1, wherein the inner edge surface is separated from the support substrate by a gap.

11. The vibratory gyroscope of claim 1, wherein the inner edge surface is attached to the support substrate.

12. The vibratory gyroscope of claim 11, wherein the resonator outer surface extends to the inner edge surface and defines a resonator passthrough opening such that the inner edge surface has an annulus shape and surrounds the resonator passthrough opening.

13. The vibratory gyroscope of claim 11, wherein the resonator outer surface is separated from the inner edge surface by the wall thickness and defines a resonator blind opening such that the inner edge surface has a circular shape defined by the resonator inner surface.

14. The vibratory gyroscope of claim 13, wherein the inner edge surface is entirely attached to the support substrate.

15. The vibratory gyroscope of claim 13, wherein the inner edge surface is partially attached to the support substrate such that a portion of the inner edge surface is exposed.

16. The vibratory gyroscope of claim 1, wherein the resonator support surface is continuous, forming a cylindrical surface symmetrical about the primary axis.

17. The vibratory gyroscope of claim 1, wherein the resonator support surface is segmented and formed by a plurality of segments distributed about the primary axis.

18. The vibratory gyroscope of claim 1, wherein the recessed region of the hollow shell resonator has a half-toroidal shape.

19. The vibratory gyroscope of claim 1, further comprising a plurality of primary surface electrodes, wherein:

the plurality of primary surface electrodes is positioned on and substantially parallel to the substrate primary surface, aligned and offset relative to the outer edge surface by a primary surface electrode gap, and the plurality of primary surface electrodes is uniformly distributed about the primary axis.

20. The vibratory gyroscope of claim 19, further comprising a plurality of side electrodes, wherein:

the plurality of side electrodes extends substantially perpendicular to the substrate primary surface and is aligned and offset relative to the resonator outer surface by a side electrode gap, and the plurality of side electrodes is uniformly distributed about the primary axis.

* * * * *